United States Patent [19]

Hishinuma et al.

[11] 4,145,942
[45] Mar. 27, 1979

[54] SHEARING DEVICE

[75] Inventors: Takehiro Hishinuma; Yutaka Tsuchida, both of Yokosuka, Japan

[73] Assignee: Ishikawajima-Harima Jukogyo Kabushiki Kaisha, Tokyo, Japan

[21] Appl. No.: 780,541

[22] Filed: Mar. 23, 1977

[30] Foreign Application Priority Data

May 28, 1976 [JP] Japan .................................. 51-62103
Mar. 29, 1976 [JP] Japan .................................. 51-34982

[51] Int. Cl.² .......................................... B23D 25/06
[52] U.S. Cl. ................................................. 83/316
[58] Field of Search ............................ 83/316, 317

[56] References Cited

U.S. PATENT DOCUMENTS

| 1,996,617 | 4/1935 | Hahn | 83/317 X |
| 2,351,868 | 6/1944 | Morgan | 83/17 X |
| 3,872,753 | 3/1975 | Takubo | 83/317 |
| 3,965,785 | 6/1976 | Johns | 83/316 |

FOREIGN PATENT DOCUMENTS 2436217 3/1975 Fed. Rep. of Germany ............ 83/317

Primary Examiner—J. M. Meister
Attorney, Agent, or Firm—Scrivener, Parker, Scrivener & Clarke

[57] ABSTRACT

Disclosed is a shearing device wherein a shear main body including an upper and a lower blades one of which is moved toward or away from the other for shearing an ingot is provided with eccentric means so that when the shear main body swings in synchronism with an ingot to be cut which is continuously moving, the upper and lower blades may be moved substantialy horizontally in the direction of the passage of the ingot especially when the shearing of the ingot occurs, thereby preventing the "nose bending" of the ingot.

7 Claims, 29 Drawing Figures

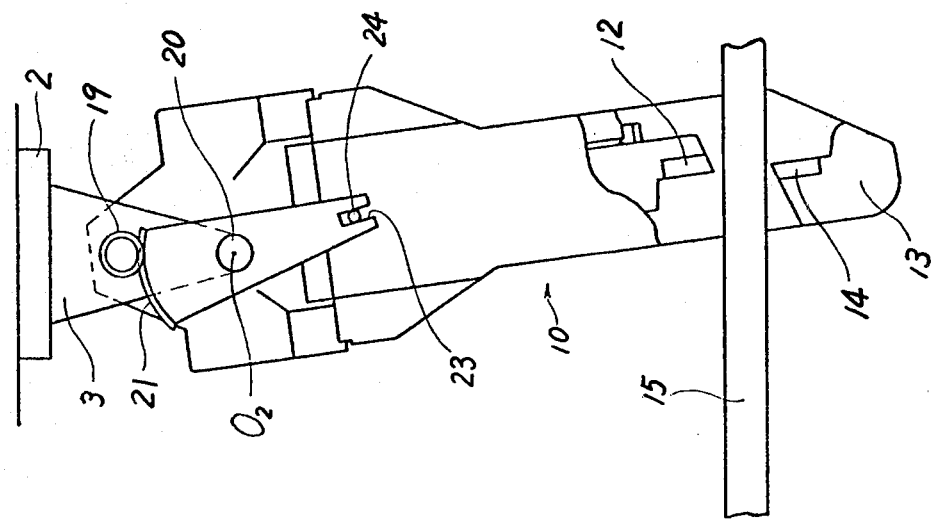
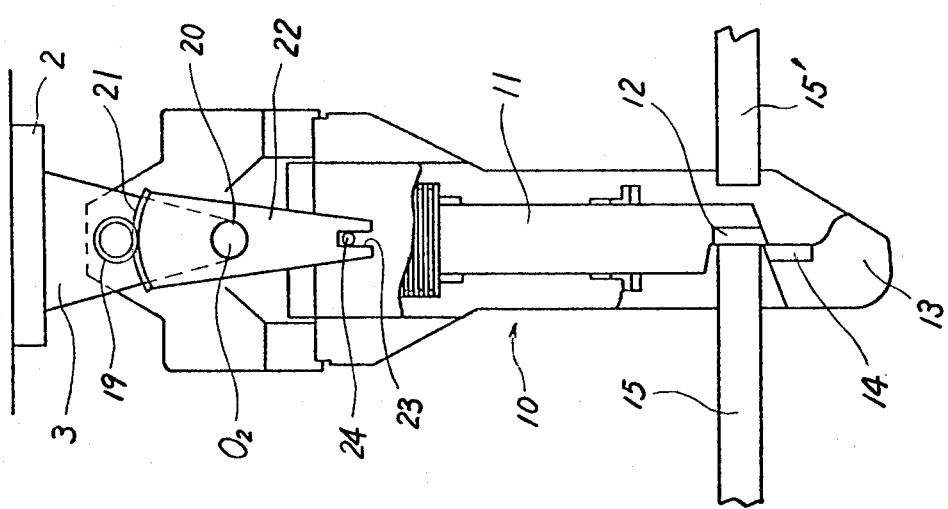
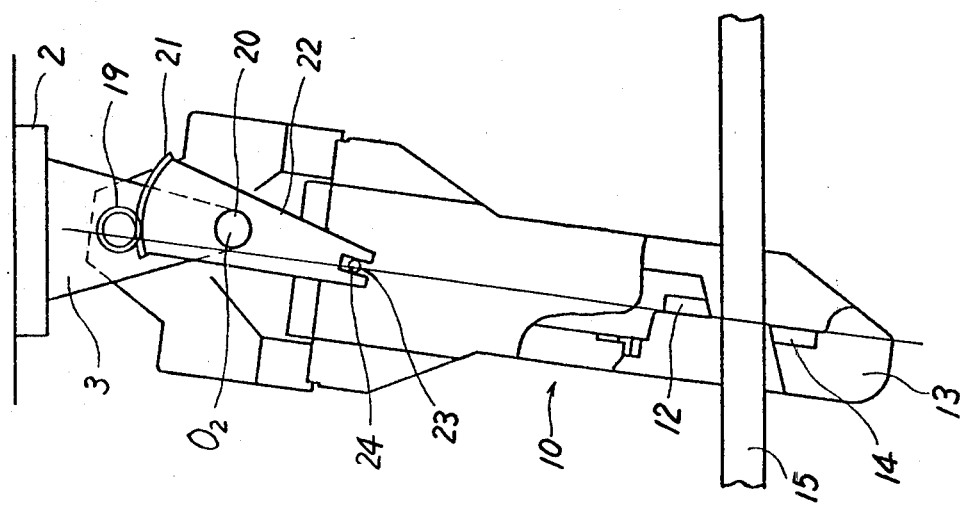

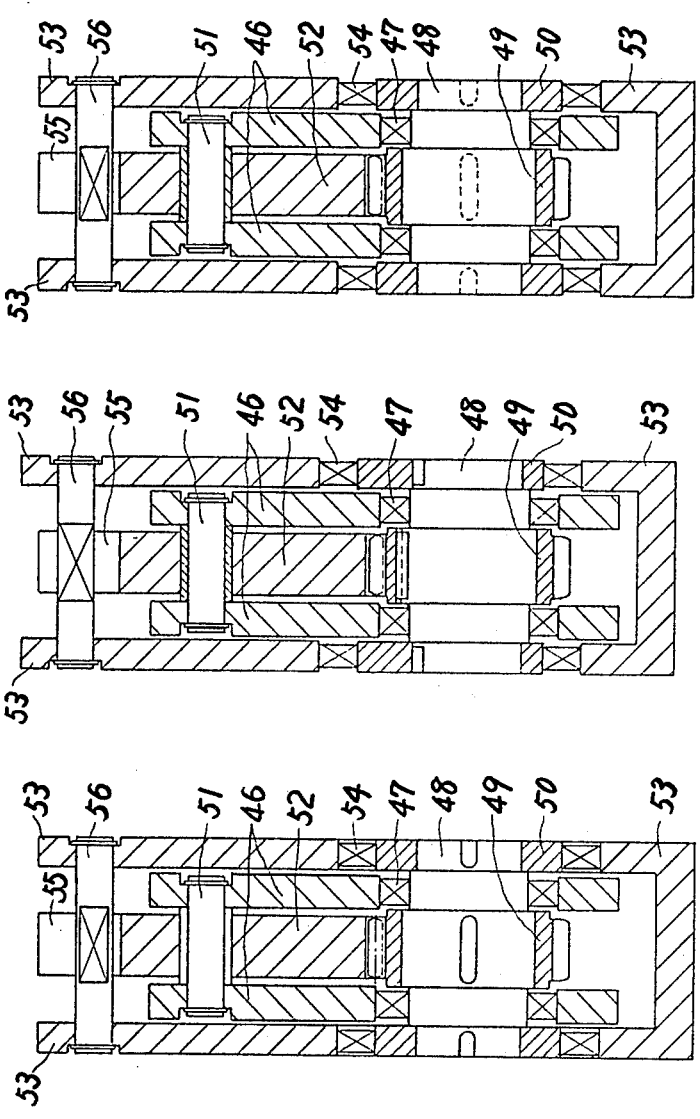

SHEARING DEVICE

DETAILED DESCRIPTION OF THE INVENTION

The conventional continuous casting apparatus, especially those for casting billets and blooms, consist of two to eight strands so that much efforts have been made in order to reduce the spacing between the strands.

The present invention relates to a pendulum type shearing device especially adapted for shearing a cast withdrawn continuously from a continuous casting apparatus for steel.

One of the objects of the present invention is not only to reduce the spacing between the strands but also to minimize the installation space of the continuous casting apparatus, thereby reducing the capital cost.

Another object of the present invention is to reduce the distance between strands in a multi-strand continuous casting apparatus so that a tundish for distributing molten steel may be made small in size and consequently the temperature drop and uneven temperature distribution of molten steel may be prevented, thereby ensuring the uniform composition of cast billets or blooms.

A further object of the present invention is to prevent the "nose bending" of a sheared billet or bloom so that the latter may have clean sheared surfaces and consequently subsequent operations such as the transfer, transportation, heating and rolling may be much facilitated.

A further object of the present invention is to provide a shearing device which is simple in both mechanism and operation and may eliminate erratic operations and troubles and whose maintenance and inspection may be much facilitated.

The above and other objects, features and advantages of the present invention will become apparent from the following description of preferred embodiments thereof taken in conjunction with the accompanying drawings, in which:

FIGS. 6A, 6B and 6C are views used for the explanation of the mode of motion of the first embodiment, FIG. 6A showing the shearing device immediately before the shearing motion is started, FIG. 6B, the shearing motion, and FIG. 6C, the shearing device after the shearing motion;

FIGS. 17A, 17B and 17C are views of a mechanism for causing the horizontal movement of a blade when a main body swings;

FIGS. 18A, 18B and 18C are schematic views of eccentric disks; and

PRIOR ART, FIGS. 1-3

Prior to the description of the preferred embodiments of the present invention, the prior art shearing devices will be described briefly in order to specifically and distinctly point out the problems thereof.

In general, the prior art shearing devices may be divided into a "carriage" type and a pendulum type. The former type has wheels so that the spacing between strands cannot be reduced to a desired extent. Therefore the pendulum type shearing device will be described with reference to FIGS. 1 and 2.

Figure 1:
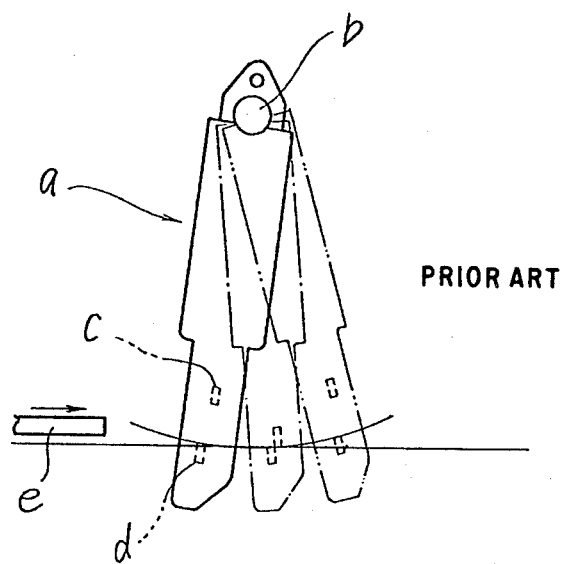
FIG. 1 is a schematic view of a prior art pendulum type continuous shearing device.
Figure 2:
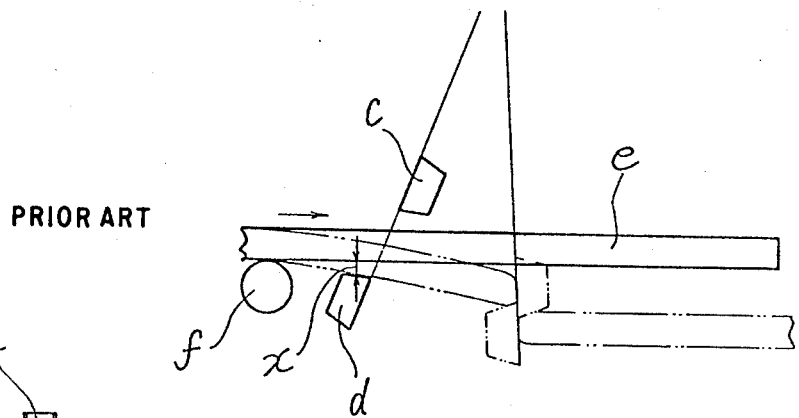
FIG. 2 is a view used for the explanation of the "nose bending" caused by the shearing device shown in FIG. 1.

In FIGS. 1 and 2, a is a shear main body; b, a shaft about which the shear main body a swings; c, an upper blade which may be lifted or lowered by a hydraulic power cylinder (not shown); d, a lower blade securely attached to a lower portion of the shear main body a; e, an ingot to be sheared; and f, a suide roll of shear entry table which serves as a support for supporting the ingot e when it is cut.

In operation, the shear main body a is held at an angle with respect to the vertical as indicated by the solid lines in FIG. 1 when the ingot e is advanced toward the shearing device. In response to the shearing signal from a measuring unit of length (not shown), the shear main body a is caused to swing about the shaft b by driving means (not shown) in synchronism with the ingot e. Simultaneous with the starting of swinging motion of the shear main body a, the upper blade c is lowered by the hydraulic cylinder (not shown). The ingot e is sheared when the shear main body a and the upper blade c are in the positions indicated by the one-dot chain lines in FIG. 1, and thereafter the shear main body a overruns to the position indicated by the two-dot chain lines and returns to the initial position indicated by the solid lines.

When the shear main body a approaches to the vertical position, the lower blade d is spaced apart from the lower surface of the ingot e by a distance x as shown in FIG. 2. Since the upper blade c must engage with the lower blade d in shearing, the ingot e is caused to bend as indicated by the two-dot chain lines, and the reaction of the bending of the ingot e exerts on the front members; that is, the members at the upstream of the shear main body a such as the guide roll f. The shorter the distance between the shear main body a and the guide roll f, the greater the reaction becomes, and consequently the guide roll f must be so designed and fabricated as to withstand an unnecessarily greater load. The shear main body a makes the pendulum motion; that is, the swinging motion about the shaft b so that the loci of the upper and lower blades c and d do not coincide with the path of the ingot e. As a result, the "nose bending" occurs. (That is, the leading end of the sheared ingot is bent.) The ingots with the "nose bending" adversely affect the subsequent operations and present a problem in the reduction of the spacing between the strands.

Figure 3:
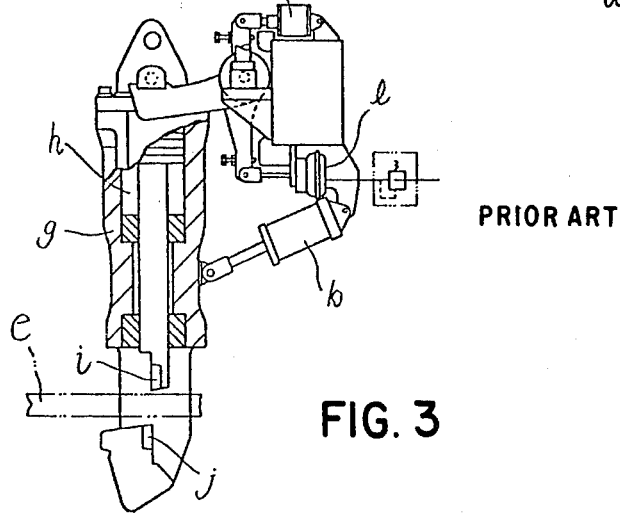
FIG. 3 is a schematic view, partly in section, of another prior art shearing device.

To overcome the above and other problems, there has been invented and demonstrated a pendulum type shearing device of the type shown in FIG. 3. In order that a cylinder h which is incorporated within the shear main body g may produce a sufficient shearing force, the diameter of the cylinder h must be sufficiently large or the hydraulic pressure must be increased. From the standpoints of economy, safety and stability in operation, there is a limit to the increase in hydraulic pressure. As a result, the diameter of the cylinder h must be increased and consequently the shear main body g becomes large in size. As a consequence, the reduction in spacing between the strands cannot be attained. In addition, a mechanism for causing the parallel movements of the upper and lower blades i and j consists of a hydraulic cylinders k and m, a diaphragm valve l and limit switches so that it is very complex in construction and operation and very frequently tends to be broken. Thus the maintenance of such shearing device as shown in FIG. 3 is very difficult.

In a multi-strand continuous casting apparatus or installation two to eight ingots are simultaneously cast and withdrawn so that an installation space is determined mainly depending upon the spacing between the strands. Thus the smaller the spacing between the strands, the greater the economical advantages become. In addition to the shearing device, there are other devices and equipment which are also the factors for determining the spacing between the strands. Even when the problems of other devices and equipment have been solved, the continuous casting apparatus cannot be made compact in size and light in weight unless the problems of the shearing device is solved.

The present invention was made to solve these problems and provides a shearing device wherein a hydraulic cylinder is used for transmitting the shearing force to a blade and a member to be sheared such as an ingot is sheared by moving the stationary blade in the horizontal direction or by supporting the ingot in a horizontal position by the stationary blade or by pushing the ingot upwards by the stationary blade.

FIRST EMBODIMENT, FIGS. 4-8

Figure 4:
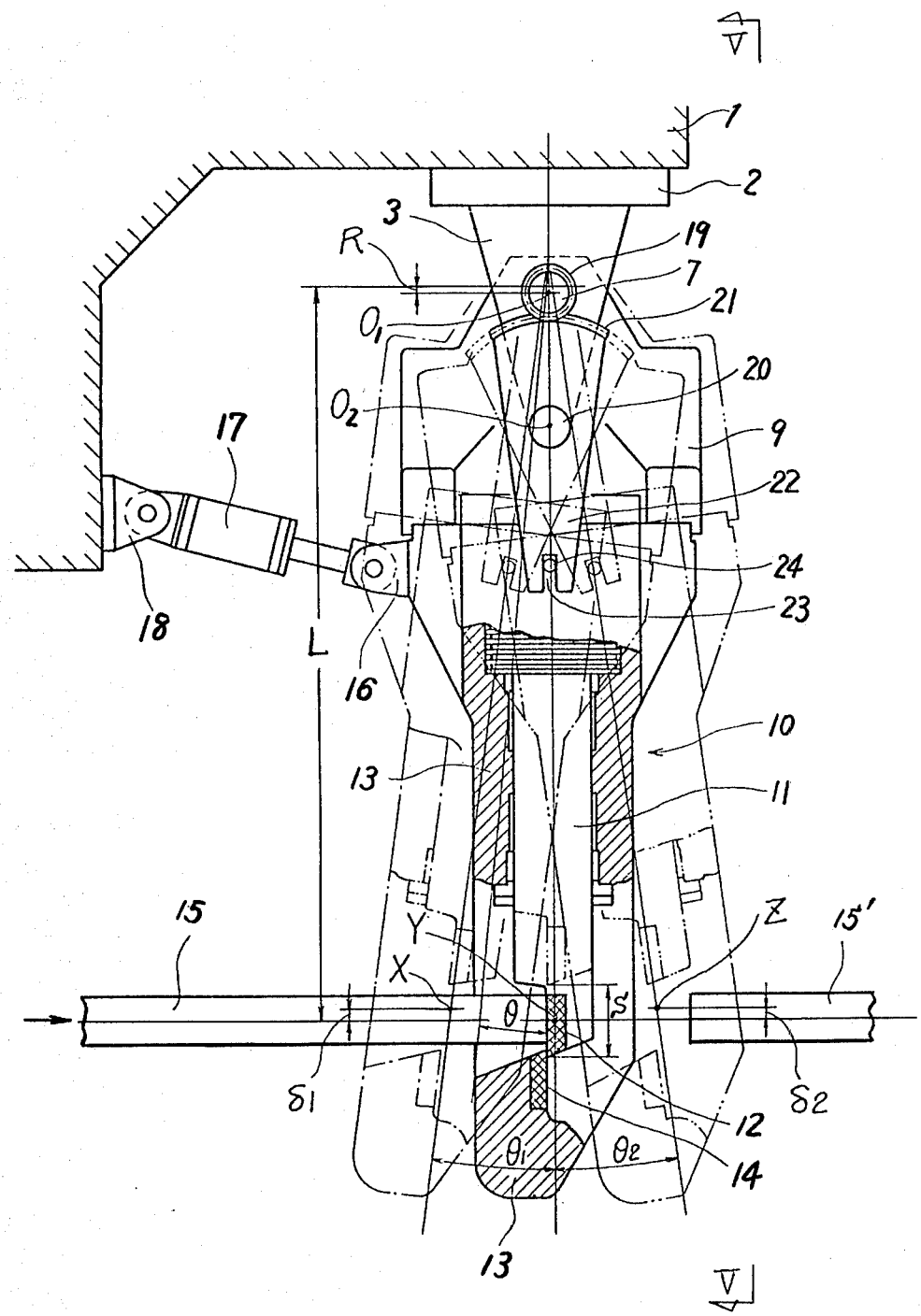
FIG. 4 is a schematic longitudinal sectional view of a first preferred embodiment of a shearing device in accordance with the present invention.
Figure 5:
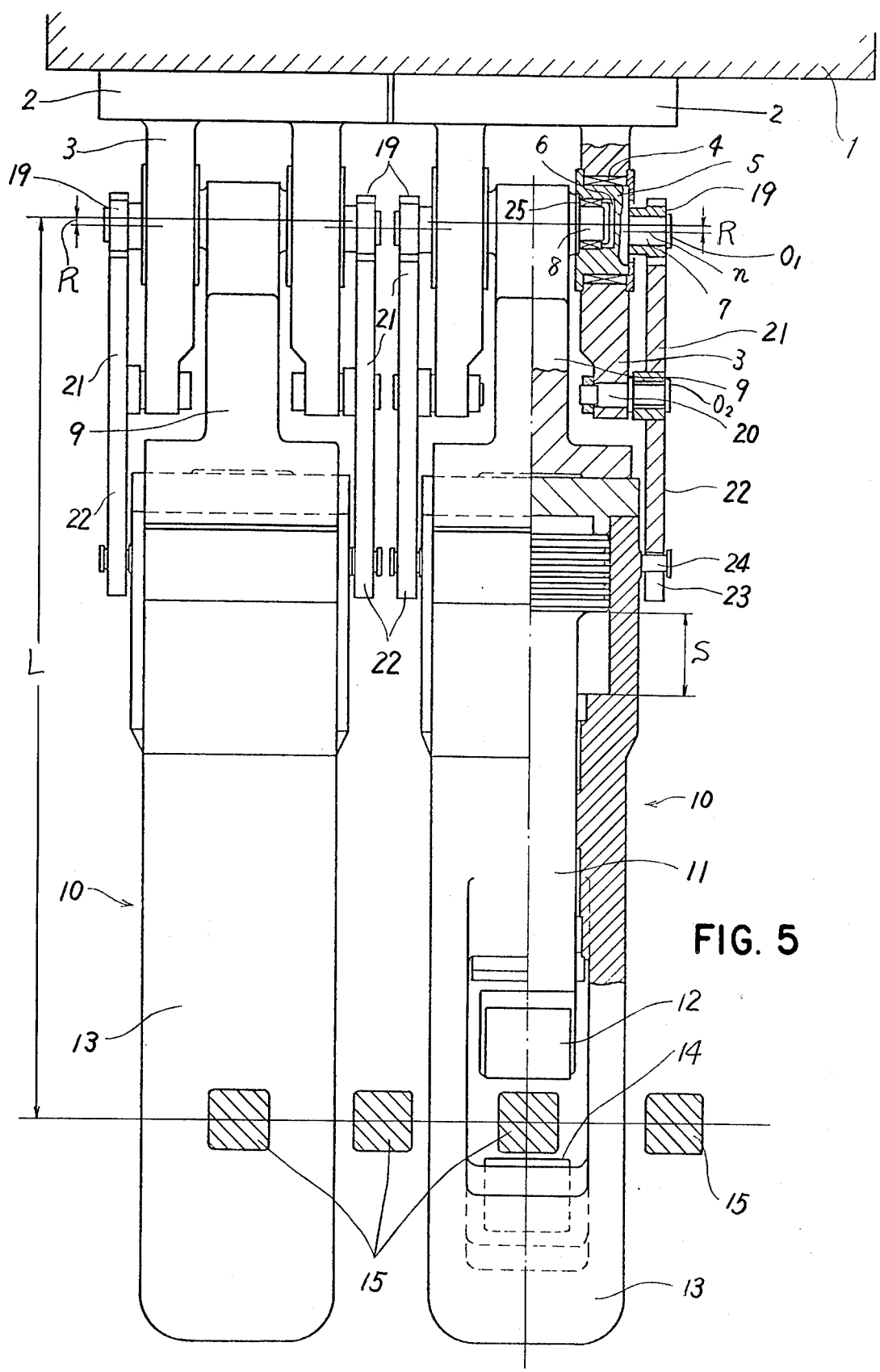
FIG. 5 is a front view with part cut away, taken in the direction indicated by the arrows V—V of FIG. 4.

Referring to FIGS. 4 and 5, a bearing stand 2 is securely joined to the undersurface of a beam 1 which in turn is securely attached to a frame of a shearing device, and side walls 3 are extended downwardly from the bearing stand 2 and are formed with holes into which are fitted bearings 4 for supporting shafts 5. Formed in one or inner end of the shaft 5 is a hole 6 with the axis eccentrically spaced apart from the axis n of the inner shaft 5 by R, and formed integral with the other end of the shaft 5 is an eccentric shaft 7 coaxial with the shaft 5.

Shaft 8 of a bracket 9 suspending a shear main body 10 are rotatably received in the holes 6 with bearings 25 interposed therebetween.

The shear main body 10 which shears an ingot 15 consists of a hydraulic cylinder with a rod 11, an upper blade 12 removably attached to the lower end of the rod 11 and a lower blade 14 stationarily attached to the lower end of a frame 13. A hydraulic cylinder 17 is interposed between the vertical side wall of the beam 1 and the front side (that is, the upstream side) of the shear main body 10 with one end of the cylinder 17 pivoted to a bracket 18 and the other end (that is, the free end of the rod) pivoted to a bracket 16 so that the hydraulic cylinder 17 may swing the shear main body 10 in a vertical plane containing the axis of the ingot 15.

A pinion 19 which is carried by the eccentric shaft 7 coaxially thereof is in mesh with a segment gear 21 pivoted with a pin 20 to the side plate 3, and a guide pin 24 extended laterally from an upper portion of the frame 13 of the shear main body 10 is slidably fitted into a guide groove or slot 23 at the lower or bifurcated end of an arm 22 of the segment gear 21.

In FIGS. 4-8, 15' denotes a sheared ingot; $\theta_1$, $\theta_2$ and $\theta$, angles of inclination of the shear main body 10; S, a stroke of the cylinder rod 11; $0_1$, axis of the eccentric shaft 7; $0_2$, the axis of the pin 20; X, the position of a reference point of the shear main body 10 when the latter is in the waiting position; Y, the position of the reference point immediately before the ingot 15 is completely sheared; Z, the position of the reference point after the overrun of the shear main body 10; $X_1$, $Y_1$ and $Z_1$, the positions of the axis of the center shaft 8 corresponding to the positions X, Y and Z, respectively, of the reference point; L, a vertical distance from the axis of the center shaft 8 to a bisecting plane of the ingot 15; $\delta_1$, a displacement of the reference point in X position from the bisecting plane of the ingot 15 when the eccentricity R is zero; and $\delta_2$, a displacement of the reference point in Z position from the bisecting plane of the ingot 15 when the eccentricity is zero.

Next the underlying principle of the present invention will be described. First it is assumed that the eccentricity R of the eccentric shaft 7 is zero. Then the displacements or deviations $\delta_1$ and $\delta_2$ of the reference point in the X and Z positions are given by $$\delta_1 = L (1 - \cos\theta_1),$$

and $$\delta_2 = L (1 - \cos\theta_2)$$

That is, when the eccentricity of the center shaft 8 with respect to the axis of the shaft 5 is zero and when the shear main body 10 is caused to swing about the center shaft 8, the reference point describes an arc so that the upper and lower blades 12 and 14 are raised and lowered. As a result, the ingot 15 is subjected to the "nose bending" as with the case of the prior art shearing machines of the types described above.

However when the eccentricity R = $\delta_1$ and when the center shaft 8 is so eccentrically disposed that its axis is vertically above the axis of the eccentric shaft 7 when the reference point of the shear main body 10 is at the position X; that is, when the shear main body 10 is substantially vertical, then the reference point is caused to move along a substantially horizontal path even though the shear main body 10 swings. Therefore at the positions X, Y and Z, the reference point is deviated upwardly from the bisecting plane of the ingot 15 by $\delta_1$.

The displacement of the reference point when it is displaced from the position X to the position Y as the shear main body 10 swings through $\theta_1$ is given by $$\Delta = L(\cos\theta - \cos\theta_1) + R\left\{\cos H - \cos\left(\frac{\theta}{\theta_1}H\right)\right\}$$

$$= L\left[(\cos\theta - \cos\theta_1) - \left(\frac{1-\cos\theta_1}{1-\cos H}\right)\left(\cos\left(\frac{\theta}{\theta_1}H\right) - \cos H\right)\right]$$

Where
$R = L(1-\cos\theta_1/1-\cos H)$,
$H$ = angle of rotation of pinion 19 and $\pi < H < 0$,
and $\theta \leq \theta_1$ and $\theta_2$ Therefore the vertical displacement $\Delta$ relative to the horizontal reference line of the blade is dependent upon the vertical distance L or radius of the swinging motion of the shear main body 10, the angle $\theta_1$ and the angle H of rotation of the pinion 19 which is eccentrically disposed with respect to the center shaft 8 by R. As a result, the displacement $\Delta$ may be made so small from a few milimeters to 0.1 milimeter by suitably selecting L, $\theta_1$ and H that it may be negligible, and the blades 12 and 14 may be caused to move substantially in parallel with the direction of the path of the ingot 15.

More specifically, with $L = 1,150$ mm, $R = 26$ mm, $2H = 180°$ and $\theta_1 = 12.265°$, the maximum displacement $\Delta$ max = 1.4 mm, which occurs when the angle $\theta = 8.4°$.

Next the mode of operation of the first embodiment with the above construction will be described in detail on the assumption that $-\pi/2 \leq H \leq \pi/2$. When the ingot 15 passes through the shearing device by a predetermined distance, in response to the control signal from the electronic control unit, the hydraulic pressure is forced into the hydraulic cylinder in the shear main body 10 so that the rod 11 is lowered and consequently the upper blade 12 is lowered. Simultaneously the hydraulic cylinder 17 is also activated to cause the shear main body 10 to swing about the axis of the center shaft 8 which is positioned at $X_1$ (See FIG. 8) in such a way that the upper blade 12 may move substantially in synchronism with the ingot 15. The guide pin 24 which is in slidable engagement with the guide slot 23 at the lower end of the arm 22 of the segment gear 21 caused the gear 21 to rotate about the pin 20. Since the segment gear 21 is in mesh with the pinion 19 which is eccentrically disposed with respect to the center shaft 8 by R, the former causes the latter to rotate about the axis $0_1$ so that the shaft 5 is rotated and consequently the axis of the center shaft 8 which is rotatably supported by the shaft 5 changes gradually.

Figure 7A:
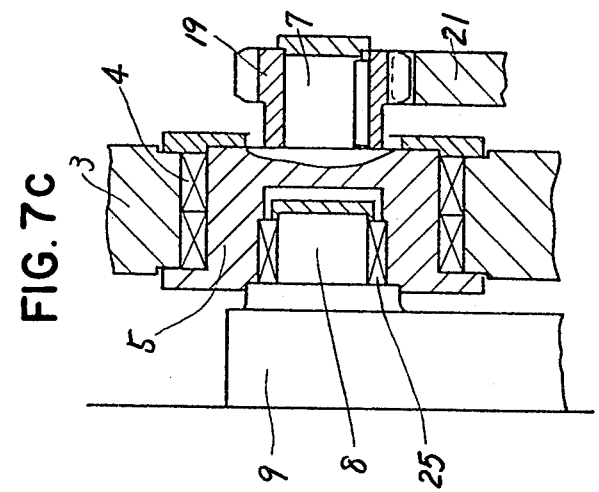
FIGS. 7A, 7B and 7C are views used for the explanation of a mechanism for causing the horizontal movement of a blade when a main body swings.
Figure 8A:
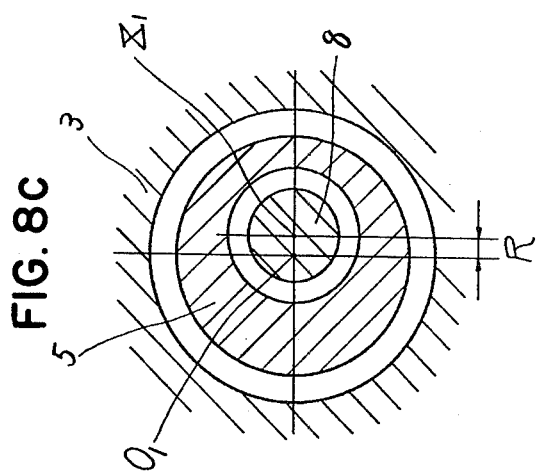
FIGS. 8A, 8B and 8C are sectional views thereof.

As shown in FIGS. 7A and 8A, when the shear main body 10 is in the position shown in FIG. 6A, the axis of the center shaft 8 is in the horizontal plane including the axis of the shaft 5 or eccentric shaft 7 and is spaced therefrom by R to the left. Then the axis of the center shaft 8 is caused to rotate from $X_1$ to $Y_1$ in the clockwise direction about the axis n of the shaft 5 or 7 as the latter is rotated. As a result, the shear main body 10 is lifted by a distance equal to R when it is substantially in the vertical position shown in FIG. 6B, and the axis of the center shaft 8 is at the highest position whereas the rod 11 is extended fully over the stroke S so that the ingot 15 is sheared by the upper and lower blades 12 and 14. The vertical displacements of the upper and lower blades 12 and 14 are negligible so that the "nose bending" may be completely eliminated.

After the ingot 15 has been sheared in the manner described above, the rod 11 is withdrawn upwardly and so is the upper blade 12 while the shear main body 10 overruns to the position shown in FIG. 6C. In this position, as shown in FIGS. 7C and 8C, the axis $Z_1$ of the center shaft 8 is in the horizontal plane including the axis of the shaft 7 and is spaced apart therefrom by a distance equal to R to the right. As soon as the shear main body 10 reaches the position shown in FIG. 6C, the hydraulic cylinder 17 retracts its rod to bring the main shear body 10 back to the initial position shown in FIG. 6A. Thereafter the shearing cycle is repeated in the same manner described above, and the ingot 15 is successively sheared into a predetermined length.

The shearing device described so far is very simple in construction so that it may be made very compact in size and consequently the spacing between the strands may be reduced to a minimum. More particularly in the conventional continuous casting apparatus for casting an ingot having a square cross section of 120 mm × 120 mm the spacing between the strands is in general 1,200 to 1,400 mm, but with the shearing devices of the first embodiment the spacing may be reduced as small as 600 mm. Furthermore when the shearing devices are staggered or installed alternately at the downstream and upstream sides the spacing may be reduced to 300 mm.

SECOND EMBODIMENT, FIGS. 9 AND 10

Figures 9, 10:
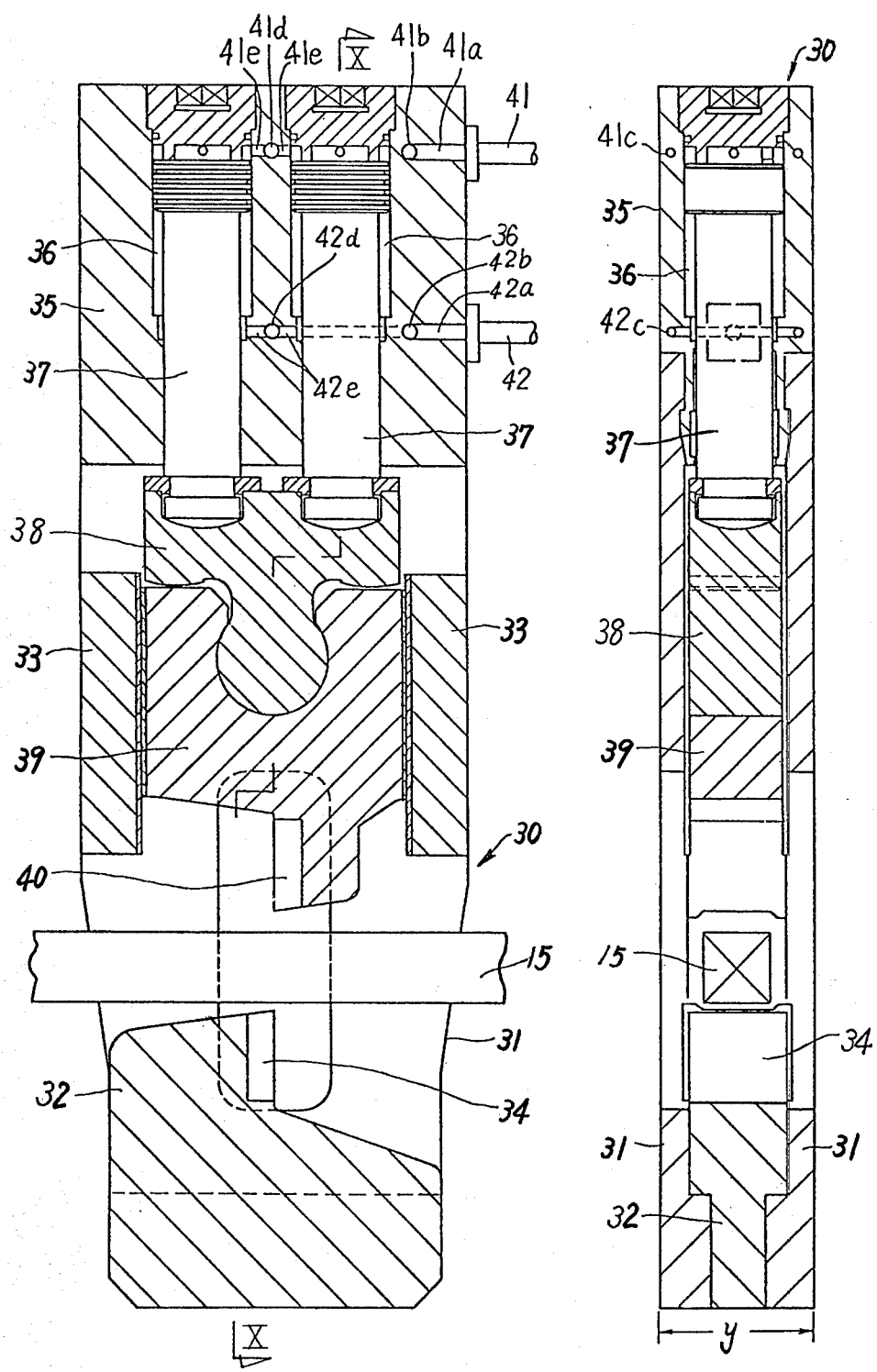
FIG. 9 is a schematic longitudinal sectional view of a second preferred embodiment of the present invention.
FIG. 10 is a sectional view taken along the line X—X of FIG. 9.

The second embodiment shown in FIGS. 9 and 10 has a main shear body 30 consisting of two parallel side plates 31 and upper and lower intermediate members 33 and 32 disposed between the side plates 31 and securely attached thereto. The lower intermediate member 32 serves as a holder for holding an lower blade 34.

A cylinder main body 35 is securely joined to the upper ends of the side plates 31 of the shear main body 30 and is formed with two cylinder bores 36 into which are slidably fitted rods 37. As best shown in FIG. 9, the cylinder or cylinder bores 36 are arrayed in tandem in the direction of the pass of the ingot 15. As shown in FIG. 9 the length of the shearing device is relatively longer, but as shown in FIG. 10 the width is very small.

The lower or free ends of the rods 37 are securely joined to a connecting member 38 having a cylindrical projection extended downward from the lower end and fitted into a cylindrical bore formed in a sliding member 39 so that the non-uniform operations of the two rods 37 may be absorbed. The sliding member 39 with suitable slide liners is vertically slidable between the side plates 31 and the upper intermediate member 33. An upper blade 40 is securely clamped to the lower end of the sliding member 39 so that upon activation of the hydraulic cylinders 36 the upper blade 40 may be forced to move toward the lower blade 34 to shear the ingot 15.

In order to ensure the synchronous operations of the two hydraulic cylinders 36 and hence their rods 37, working oil is charged into or discharged from the cylinders 36 in a manner to be described below. That is, an upper oil line 41 is connected to a passage 41a formed in the cylinder main body 35 and communicated with passage 41b, 41c and 41d in the order named. The last passage 41d is branched into passages 41e which are communicated with the upper chambers in the cylinder bores 36. A lower oil line 42 is communicated with a passage 42a which in turn is communicated with passages 42b, 42c and 42d in the order named, and the passage 42d is branched into passages 42e which in turn are communicated with the lower working chambers in the cylinder bores 36. The working oil is discharged from either of the upper or lower working chambers through the passages 41a–41e or 42a–42e in the reversed order.

THIRD EMBODIMENT, FIG. 11

Figure 11:
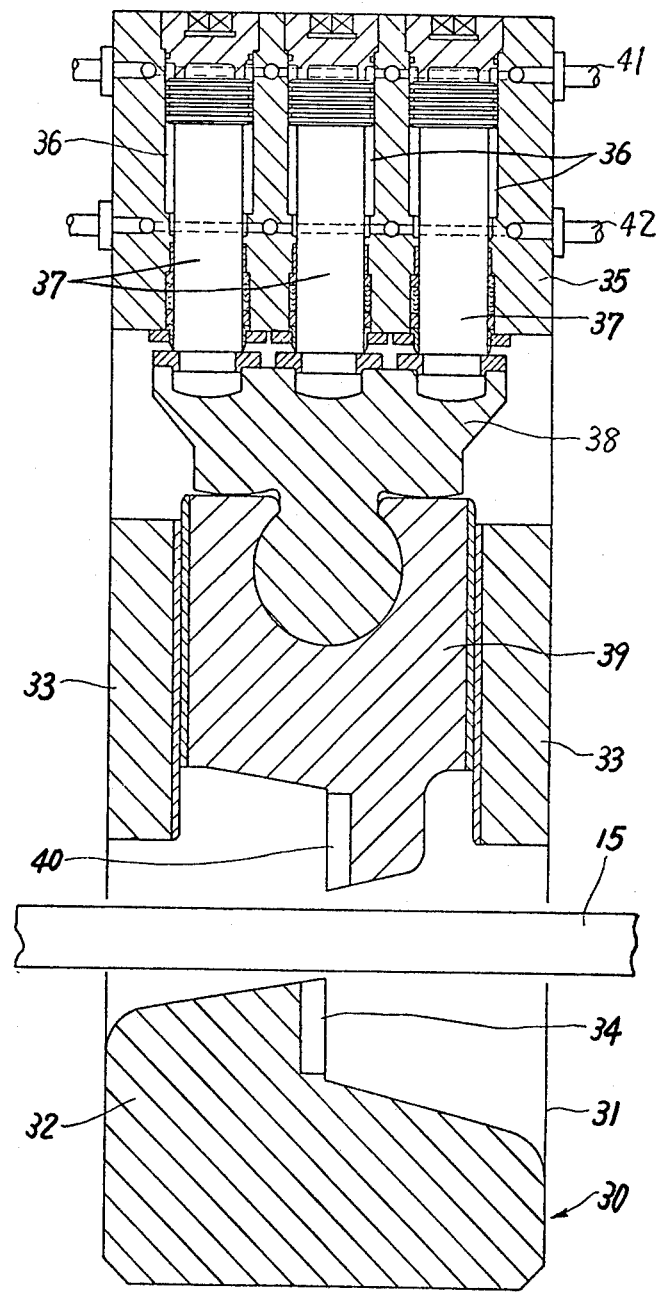
FIG. 11 is a schematic longitudinal sectional view of a third preferred embodiment of the present invention.

The third embodiment shown in FIG. 11 is substantially similar in construction to the second embodiment described above with reference to FIGS. 9 and 10 except that three cylinders 36 and their rods 37 are arranged in the direction of the pass of the ingot 15, and the lower end of the rods 37 are joined to the connecting member 38 so that the unsynchronized operations of the rods 37 may be absorbed as with the case of the second embodiment.

Even when the number of hydraulic cylinders 36 are increased, the width y of the shearing device in accordance with the present invention remains unchanged as shown in FIG. 10 so that a plurality of hydraulic cylinders 36 may be arrayed in order to obtain a sufficient shearing force. In addition with the increase in number of cylinders 36, their diameter may be reduced to obtain the same shearing force and consequently the width of the shearing device may be further decreased.

FOURTH EMBODIMENT, FIGS. 12 AND 13

Figure 12:
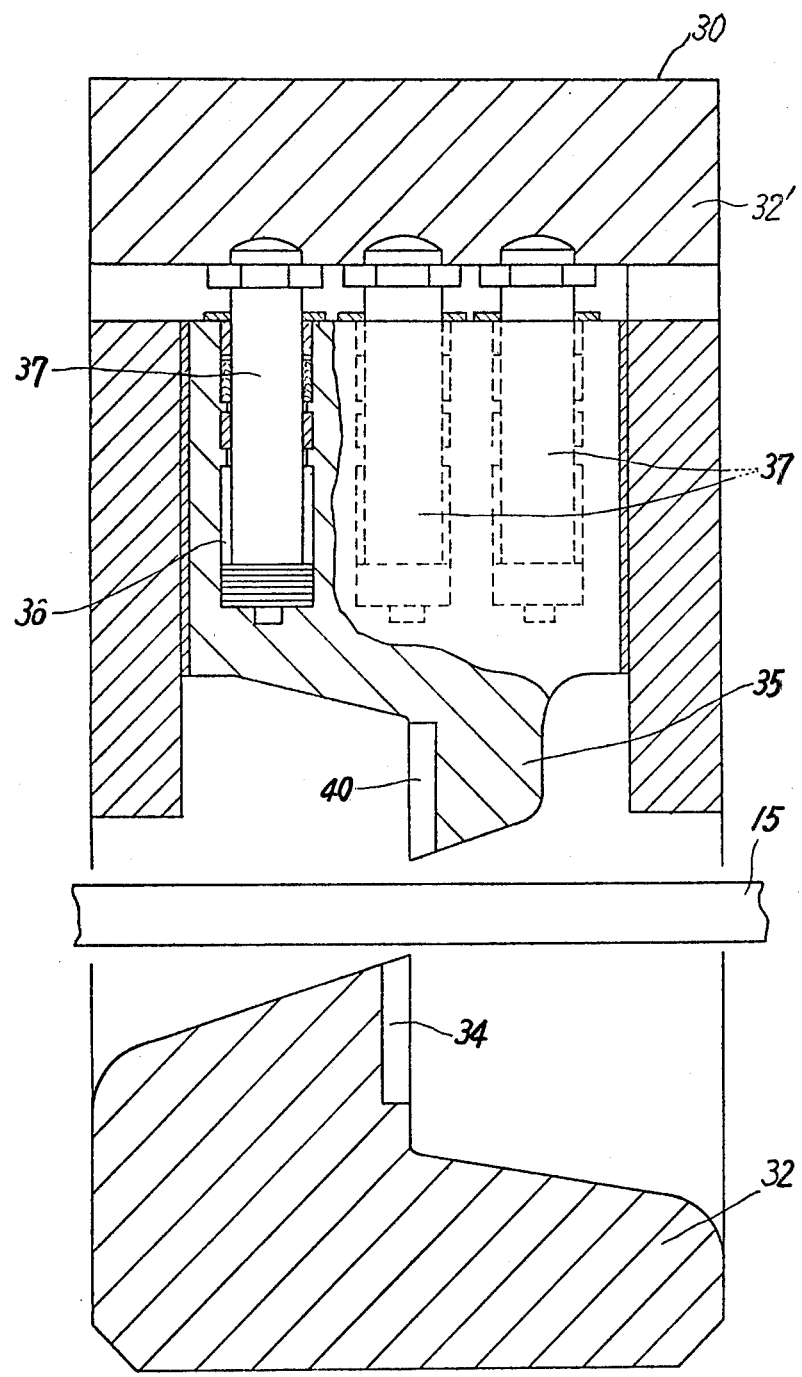
FIG. 12 is a schematic longitudinal sectional view of a fourth preferred embodiment of the present invention.
Figure 13:
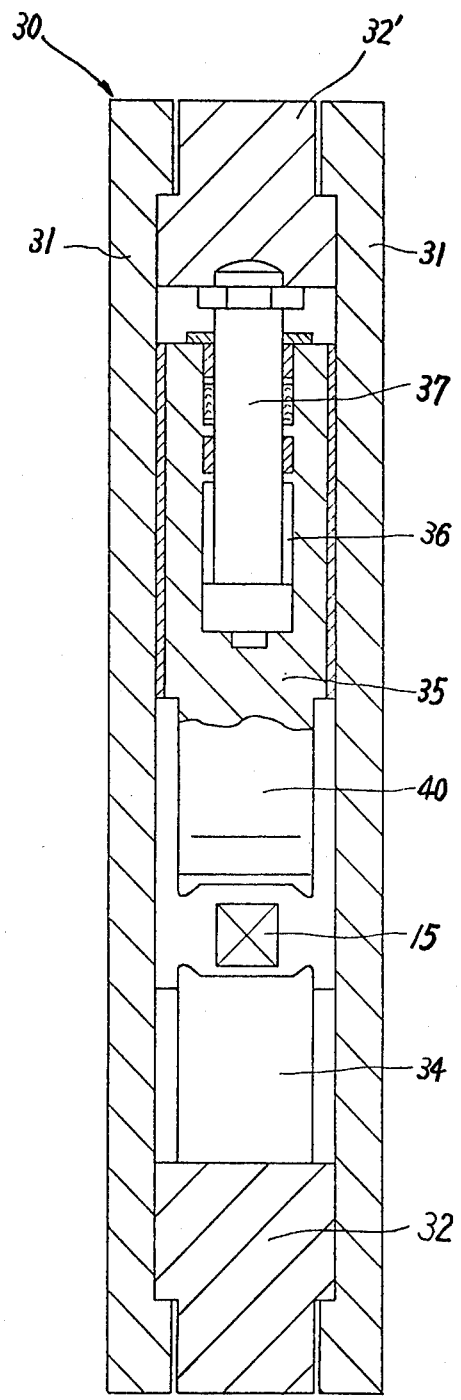
FIG. 13 is a schematic front sectional view thereof.

The fourth embodiment shown in FIGS. 12 and 13 is substantially similar in construction to the third embodiment described above except that the cylinder main body 35 is so arranged as to be vertically slidable relative to the shear main body 30. For this purpose, the upper ends of the rods 37 are joined to an intermediated member 32'.

INSTALLATION IN MULTI-STRAND CONTINUOUS CASTING APPARATUS, FIGS. 14–16

Figure 14:
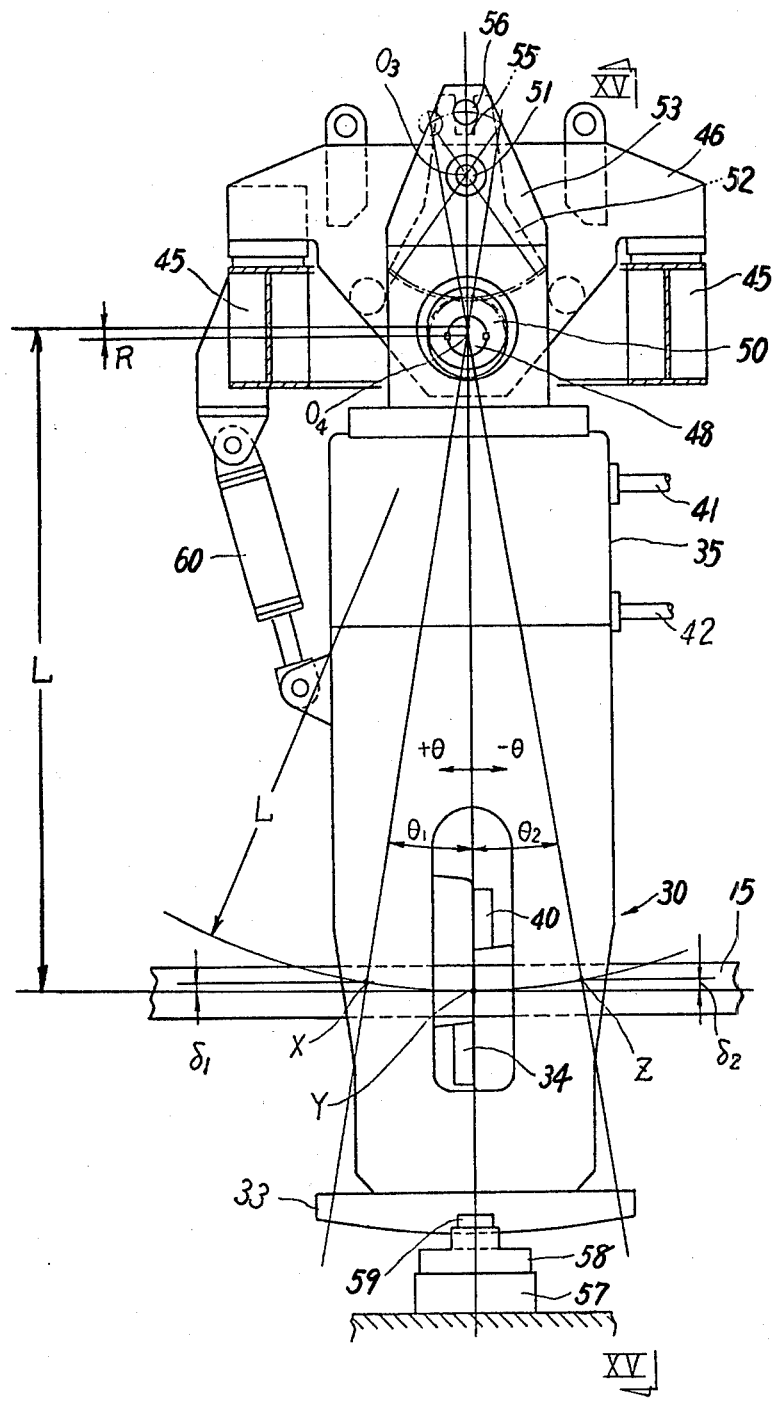
FIG. 14 is a side view of a shearing device of the present invention installed in a multi-strand continuous casting apparatus.
Figure 15:
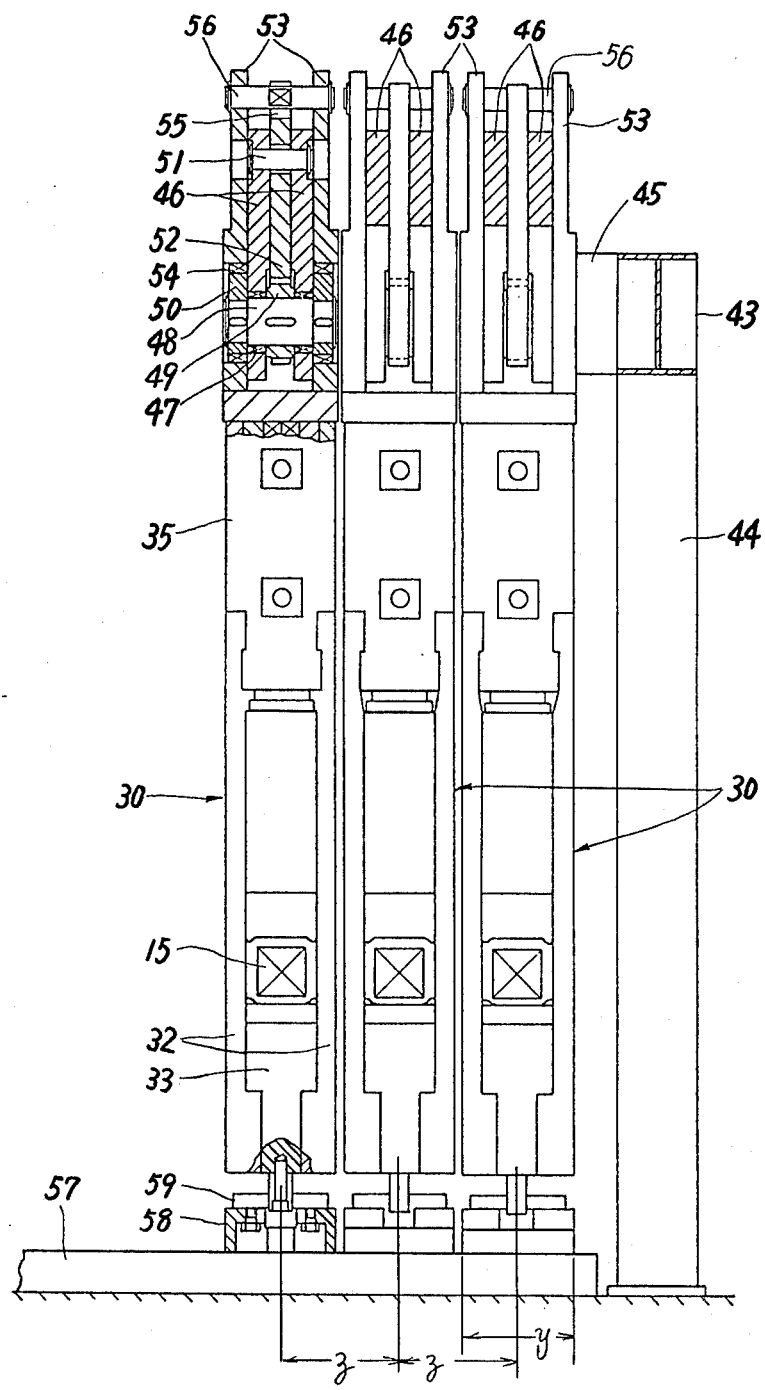
FIG. 15 is a view looking in the direction indicated by the arrows XV—XV of FIG. 14, part being shown in cross section.
Figure 16:
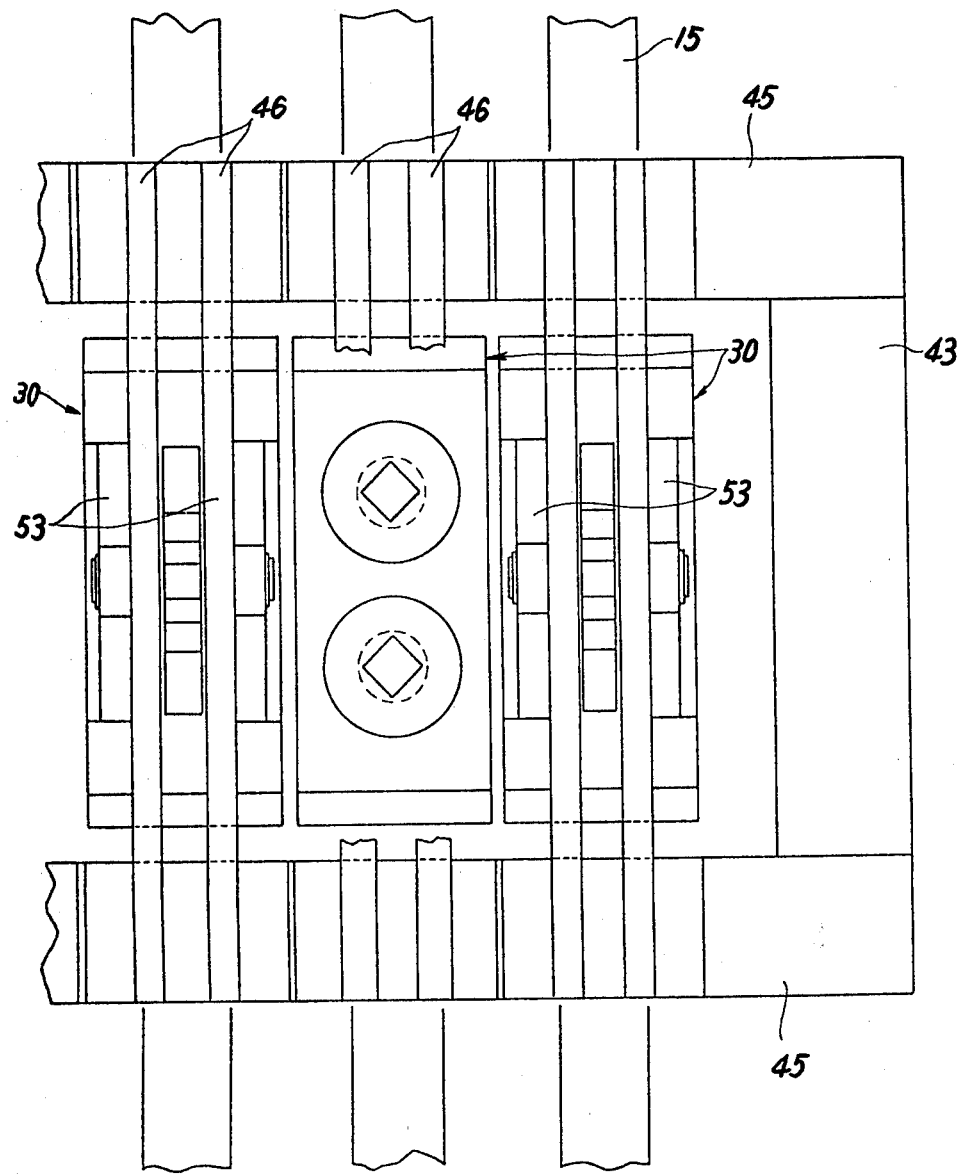
FIG. 16 is a top view thereof.

Next the combination of the shearing devices of the type shown in FIGS. 9 and 10 or FIG. 11 or FIGS. 12 and 13 with a multi-strand continuous casting apparatus will be described with reference to FIGS. 14–16. A plurality of bracket pairs 46 equal in number to the shear main bodies 30 or strands are mounted on frames 43 of the continuous casting apparatus, and each bracket pair 46 carries rotatably a horizontal center shaft 48 which in turn carries a pinion 49 and has eccentric disks 50 attached to the ends, respectively. The pinion 49 is in mesh with a segment gear 52 rotatably carried by a shaft 51 which in turn is supported between the bracket pair 46 above the center shaft 48. Brackets 53 are joined to the upper end of the shear main body 30 and rotatably support the eccentric disks 50 with bearings 54 interposed between the disks 50 and the brackets 53. Therefore the shear main body 30 is suspended from the brackets 46 through the brackets 53, the bearings 54, the eccentric disks 50, the center shaft 48 and the bearings 47.

The upper end of the segment gear 52 is terminated into a vertical guide slot 55 into which is slidably fitted a guide pin 56 laterally extended from the upper portion of the bracket 53.

The intermediate member 33 is guided by guide rollers 59 mounted on a support 58 which in turn is mounted on a base 57.

In order to cause the swinging motion of the shear main body 30, the head of a hydraulic cylinder 60 is pivoted to a bracket extended from the beam 45 which is mounted on a frame 43 supported on a frame 44, and the free end of the piston rod is connected to the shear main body 30. The hydraulic cylinder 60 is actuated in synchronism with the passage of the ingot 15 simultaneous with the activation of the cylinders 36 in the cylinder main body 35 so that the ingot 15 may be sheared while running. After one cycle of the shearing operation the shear main body 30 is returned to the initial or waiting position as described in detail hereinbefore with reference to FIGS. 4–8.

Figure 7B:
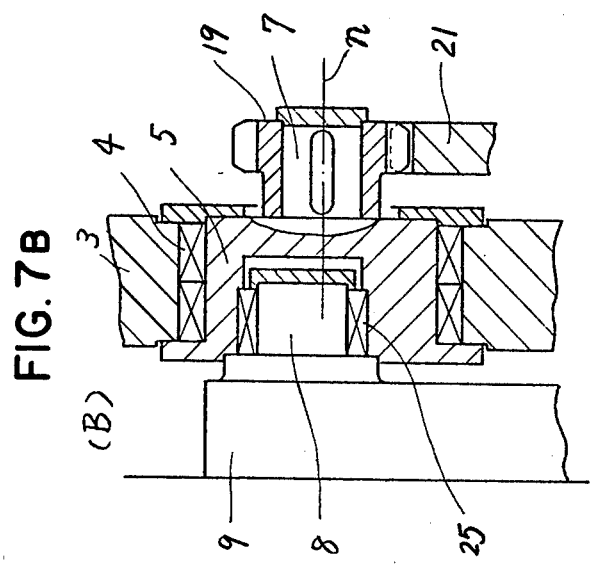
Figure 8B:
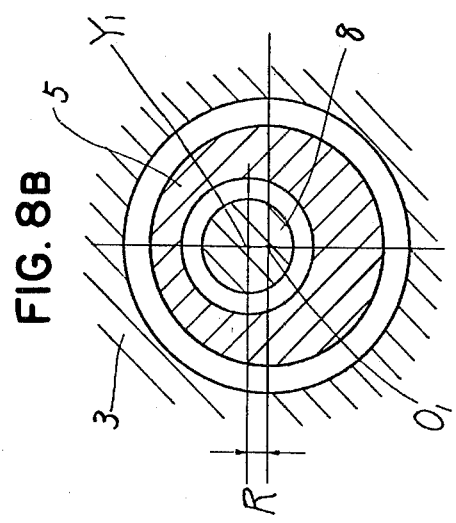
Figure 7C:
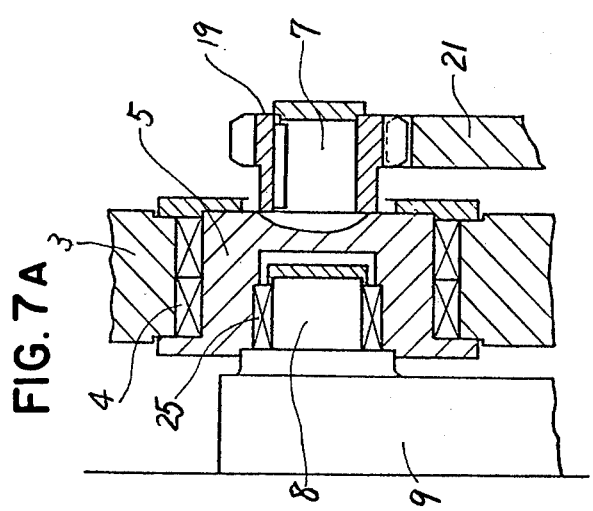
Figure 8C:
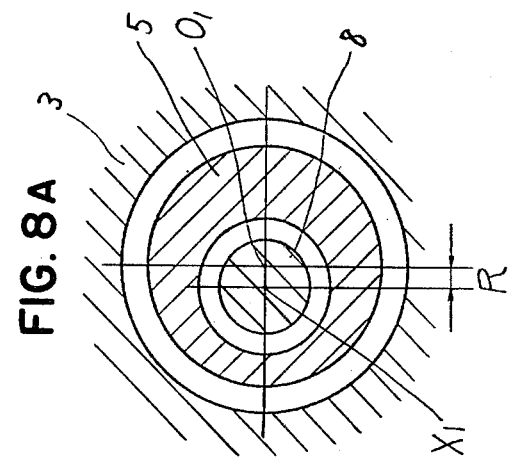

The shearing devices described above also include a mechanism for causing the horizontal movement of the blade as shown in FIGS. 17 and 18, but its construction and mode of operation are substantially similar in principle to those of the first embodiment described with particular reference to FIGS. 7 and 8 so that no further description shall be made in this specification.

The displacement $\Delta$ is given by the equation described above, and in FIGS. 17 and 18, $0_3$ and $0_4$ denote the axes of the shaft 51 and center shaft 48, respectively.

In response to the control signal from the electronic control unit, the hydraulic cylinder 60 is activated to swing the shear main body 30 so that the guide pins 56 of the latter causes the segment gears 52 to rotate about the shaft 51. As a result, the pinions 49 are rotated and consequently the eccentric disks 50 are rotated in the manner described above to lift or lower the shear main body by a stroke equal to the eccentricity R while swinging. As a result, the upper and lower blades 34 and 40 are caused to move horizontally in the direction of the passage of the ingot 15 even though there is some nogligible deviation.

When the ingot 15 has passed through the shearing device by a predetermined distance, the shearing signal is generated from the electronic control unit and in response to this signal the upper blade 40 is lowered while the hydraulic cylinder 60 causes the swinging movement of the shear main body in synchronism with the passage of the ingot. As a result the segment gears 52 are rotated about the axis $0_3$ to rotate the pinions 49 in the manner described above. Then the center shaft 48 is caused to rotate so that the shear main body 30 is caused to be displaced from the position $X_1$ to $Y_1$ and to $Z_1$ as shown in FIGS. 18A, B and C through the eccentric disks 50. As a consequence the upper and lower blades 40 and 34 are moved horizontally in the direction substantially same with that of the passage of the ingot 15. When the shear main body 30 is substantially in the vertical position, the upper and lower blades 40 and 34 cooperate to shear the ingot 15 into a predetermined length. After the shearing, the upper blade 40 is lifted while the hydraulic cylinder 60 is so activated as to return the shear main body to the initial or waiting position. The shearing operation is cycled in the same manner described above so that the ingot 15 may be successively sheared into a predetermined length without being subjected to the "nose bending" and without the guide rollers or the like being exerted to the excessive loads. The sheared ingot 15' therefore will not adversely affect the subsequent operations such as transportation out of the continuous casting apparatus, charging the ingot into a furnace for hot rolling and the like. Furthermore very simple machine elements such as eccentric disks, pinions 49 and segment gears 52 are used so that the shearing device may be made very compact in size and consequently the spacing between the strands may be considerably reduced as described hereinbefore.

FIFTH EMBODIMENT, FIG. 19

Figure 19:
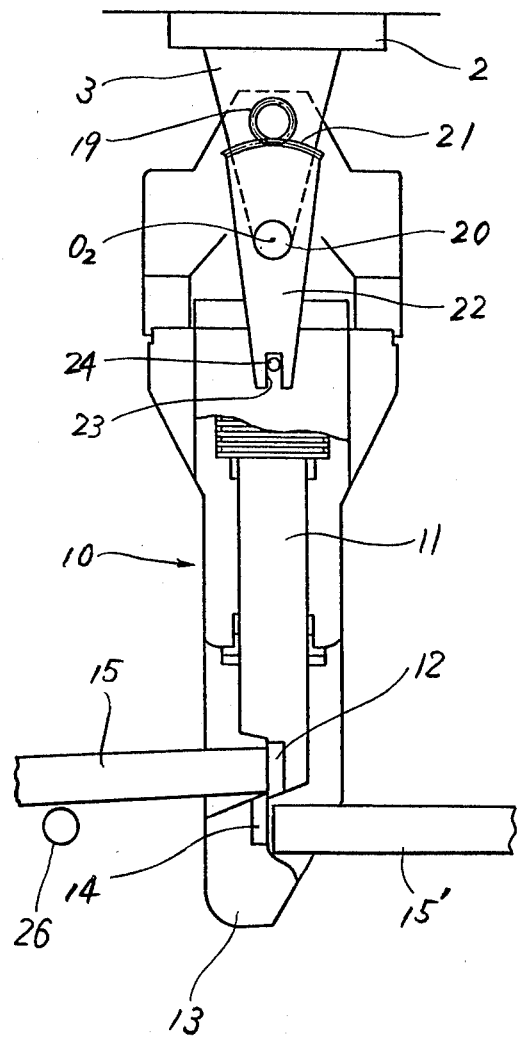
FIG. 19 is a schematic view of a fifth preferred embodiment of the present invention.

The fifth embodiment shown in FIG. 19 is substantially similar in construction to the first embodiment described with reference to FIGS. 4 and 5 except that the eccentricity R is increased so that when the shear main body 10 is substantially in the vertical position the lower blade 14 may be made in contact with the lower surface of the ingot 15 or it may slightly lift the ingot 15. Therefore the shearing may be accomplished without exerting the excessive load to the guide roller 26 in front of the shearing device.

It is to be understood that the present invention is not limited to the preferred embodiments described above and that various modifications may be effected without departing from the true spirit of the present invention. For instance, the axis of the swinging movement of the shear main body may be located below the ingot to be sheared, and the mechanism of the type shown in FIGS. 9–18 may be used to lift the lower blade for pushing the ingot upward.

What is claimed is:

1. In a shearing device of the type wherein a shear main body swingable about a center shaft is pivoted to a bracket, said main body being provided with an upper blade and a lower blade, one of the blades being vertically movable relative to the other blade to shear a workpiece, the improvement wherein said center shaft is an eccentric shaft on which a pinion is mounted, a segment gear pivoted to the bracket, and in mesh with said pinions, a guide slot formed at the end of said segment gear opposite to its toothed end and a guide pin extended from the shear main body and extending into said slot whereby the other blade is caused to move substantially horizontally when the shear main body swings.

2. A shearing device as set forth in claim 1 wherein a plurality of cylinders are arrayed within a shear main body in the direction of the passage of an ingot for reciprocally moving said one blade.

3. A shearing device as set forth in claim 2 wherein the ends of rods of said cylinders are coupled through a sliding member to said one blade.

4. A shearing device as set forth in claim 3 wherein a lower blade is vertically movable so that it may support an ingot horizontally or it may slightly push it upwardly.

5. A shearing device as set forth in claim 2 wherein said one blade is attached to one end of a cylinder main body which carries said plurality of cylinders for vertical movement.

6. A shearing device as set forth in claim 5 wherein a lower blade is vertically movable so that it may support an ingot horizontally or it may slightly push it upwardly.

7. A shearing device as set forth in claim 1 wherein a lower blade is vertically movable so that it may support an ingot horizontally or it may slightly push it upwardly.

* * * * *